UNITED STATES PATENT OFFICE.

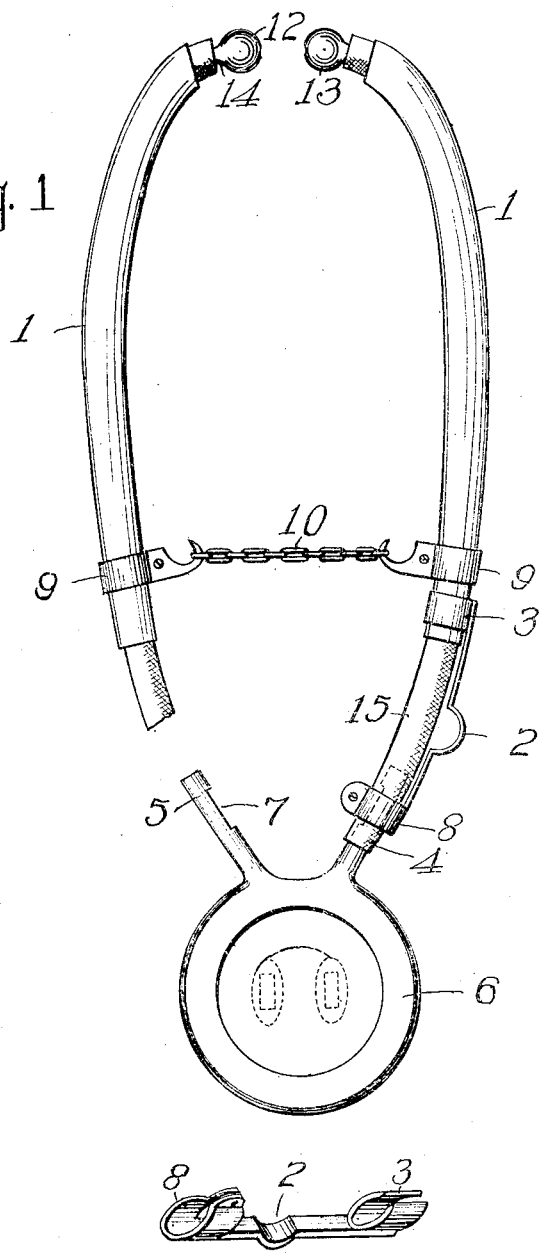

FELIX GOTTSCHALK, OF HILTON, NEW JERSEY.

EAR-TUBE.

1,245,217. Specification of Letters Patent. Patented Nov. 6, 1917.

Application filed March 3, 1916. Serial No. 81,898.

*To all whom it may concern:*

Be it known that I, FELIX GOTTSCHALK, a citizen of the United States, residing at Hilton, New Jersey, in the county of Essex and State of New Jersey, have invented certain new and useful Improvements in Ear-Tubes, of which the following is a specification, reference being had to the accompanying drawing.

My invention relates to ear-tubes for concentrating and conducting sound. Such tubes are commonly used with stethoscopes for either mechanically or electrically determining vibrations such as sounds from breathing and testing the lungs, or heart beats, minute reverberatory movements between parts of machines commonly known as "knocks" and other localized vibrations.

Ear-tubes as heretofore constructed consist either wholly of metal which is objectionable as the sound waves are distorted and produce a metallic reverberation, or of soft rubber without any support, which cracks, creases and breaks, thereby impeding the transmission of sound and requiring frequent renewals.

A combination of tubes of metal and rubber eliminates the foregoing and other objections, and my invention consists of such a combination, wherein the sound only comes in contact with rubber tubing, but said rubber tube is supported throughout so that no creasing can take place, and as the mechanical expansion and contraction is limited, the cracking and breaking is largely eliminated.

This improvement in ear-tubes is applicable to many devices, including all kinds of stethoscopes, deaf phones, phonographs or devices for testing for "knocks" and all such uses and modifications I claim as part of my invention.

In the accompanying drawing Figure 1 is a view showing my improved ear-tubes attached to a telephone receiver.

Fig. 2 is the spring member for reinforcing the rubber tubes.

Like figures of reference denote the same parts wherever they are shown.

1 denotes a metal tube properly formed into the desired shape. 2 denotes a spring member the end 3 of which fits over the bottom of tube 1, being attached thereto in any suitable manner. Running through the metal tube 1 is a rubber tube, the lower end 4 of which embraces the hollow lug 5, communicating with the interior of the telephone or other suitable sound receiver 6. The lug 5 has a countersunk portion 7, so that the clamp 8 holds the spring 2 and the end 4 of the rubber tube securely to the member 5.

9, 9, denote lugs connected to the metal tubes 1, 1, in any suitable manner and connecting these is a suitable chain or other device 10 arranged to limit the separation of the tubes and the consequent expansion of spring 2, when inserting the ear tip 12 and 13.

The ear tips are usually of hard rubber, the shank 14 fitting into the rubber tubing 4.

From the foregoing it will be observed that the separation of the tubes 1, 1, are limited by means of chain 10 or other suitable means, and that the spring 2 gives the necessary pressure to hold the ear pieces in place in the ears; that it is impossible to bend the rubber tubing except within these limits and that none of the rubber tubing is exposed to handling except in the space 15 between the points 3 and 4 and that here it is protected by the member 2.

It will be noted that the metal tube 1 and member 2 form a solid metallic path for vibrations between the receiver 6 and ear piece 13, which reinforces the air vibrations passing up the rubber tubes, thereby rendering the instrument more efficient.

Having thus described my invention, I claim—

1. In a device of the class described, flexible tubing, an external reinforcement for said tubing comprising a solid rigid metallic member inclosing a portion of said tube and a resilient member attached to said rigid member and partially surrounding the remainder of said flexible tube, substantially as described.

2. In combination, flexible tubing, metallic tubing surrounding a portion of said flexible tubing and a resilient spring member attached to said metal tubing and paralleling the uncovered portion of said flexible tubing.

3. In combination, a hollow terminal, flexible tubing connected to said terminal, metallic tubing surrounding a portion of said flexible tubing, and a resilient spring member the ends of which embrace said metal tubing and said hollow terminal.

4. Ear-tubes comprising a flexible rubber tubing, a solid metal tubing surrounding said rubber tubing for a portion of its length, and a resilient metal reinforcement connected to said metal tubing and extending along said rubber tubing substantially to one end thereof.

5. In an apparatus for transmitting sound, a receiver, hollow terminals thereon, flexible resilient non-metallic tubing connected therewith, ear tips on said tubing, rigid curved tubing surrounding a portion of said resilient tubing and connected to said ear tips and resilient metallic means connecting said receiver and said rigid tubing whereby mechanical vibrations may be transmitted from said receiver to said ear tips, substantially as described.

In testimony whereof I hereunto affix my signature in the presence of two witnesses.

FELIX GOTTSCHALK.

Witnesses:
SAMUEL B. WELLINGTON,
EDMUND R. DODGE.

Copies of this patent may be obtained for five cents each, by addressing the "Commissioner of Patents, Washington, D. C."